(12) United States Patent
Lee et al.

(10) Patent No.: US 11,804,635 B2
(45) Date of Patent: Oct. 31, 2023

(54) CROSSLINKED POLYOLEFIN SEPARATOR HAVING INORGANIC COATING LAYER AND HIGH POWER SECONDARY BATTERY COMPRISING THE SAME

(71) Applicant: LG CHEM, LTD., Seoul (KR)

(72) Inventors: Su Rim Lee, Daejeon (KR); Soon Hyung Choi, Daejeon (KR); Seok Koo Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 234 days.

(21) Appl. No.: 16/962,401

(22) PCT Filed: Oct. 30, 2019

(86) PCT No.: PCT/KR2019/014425
§ 371 (c)(1),
(2) Date: Jul. 15, 2020

(87) PCT Pub. No.: WO2020/091400
PCT Pub. Date: May 7, 2020

(65) Prior Publication Data
US 2021/0074984 A1 Mar. 11, 2021

(30) Foreign Application Priority Data

Nov. 2, 2018 (KR) .......... 10-2018-0133847

(51) Int. Cl.
*H01M 50/449* (2021.01)
*H01M 50/446* (2021.01)
(Continued)

(52) U.S. Cl.
CPC ..... *H01M 50/449* (2021.01); *H01M 10/0525* (2013.01); *H01M 50/411* (2021.01); *H01M 50/443* (2021.01); *H01M 50/446* (2021.01)

(58) Field of Classification Search
CPC . H01M 50/449; H01M 50/446; H01M 50/411
(Continued)

(56) References Cited

U.S. PATENT DOCUMENTS 6,127,438 A * 10/2000 Hasegawa .......... H01M 50/491
264/210.4
6,562,519 B2 * 5/2003 Yamamoto .......... H01M 50/411
429/129
(Continued)

FOREIGN PATENT DOCUMENTS

CN 108539089 A 9/2018
JP 2009-70620 A 4/2009
(Continued)

OTHER PUBLICATIONS

Heo et al., Controlled pore evolution during phase inversion from the combinatorial non-solvent approach: application to battery separators, 2016, Journal of Materials Chemistry A, 4, 9496-9501 (Year: 2016).*

(Continued)

*Primary Examiner* — Sean P Cullen
(74) *Attorney, Agent, or Firm* — Birch, Stewart, Kolasch & Birch, LLP

(57) ABSTRACT

A separator comprising a crosslinked polyolefin substrate having a plurality of pores and an inorganic coating layer having internal pores formed on at least one surface of the crosslinked polyolefin substrate. The inorganic coating layer on the at least one surface of the crosslinked polyolefin substrate has internal pores formed by an immersion phase separation method, and a high power secondary battery including the same.

5 Claims, 2 Drawing Sheets

<Inorganic layer by immersion phase separation>

<Inorganic layer by vapor-induced phase separation>

(51) Int. Cl.
   *H01M 50/411* (2021.01)
   *H01M 10/0525* (2010.01)
   *H01M 50/443* (2021.01)

(58) Field of Classification Search
   USPC .......................................... 429/144, 251, 254
   See application file for complete search history.

(56) References Cited

U.S. PATENT DOCUMENTS

| | | | |
|---|---|---|---|
| 2011/0027642 A1* | 2/2011 | Lee ................... | B01D 67/0079 428/315.7 |
| 2011/0033743 A1* | 2/2011 | Lee ..................... | H01M 50/417 428/213 |
| 2013/0224552 A1 | 8/2013 | Hong et al. | |
| 2016/0028067 A1* | 1/2016 | Pekala ................. | C08J 7/0423 156/247 |
| 2016/0126518 A1 | 5/2016 | Park et al. | |
| 2018/0254464 A1 | 9/2018 | Sakurai et al. | |
| 2019/0355953 A1 | 11/2019 | Nam et al. | |

FOREIGN PATENT DOCUMENTS

| | | |
|---|---|---|
| JP | 2013-161707 A | 8/2013 |
| KR | 10-2013-0099545 A | 9/2013 |
| KR | 10-2015-0025825 A | 3/2015 |
| KR | 10-2016-0052332 A | 5/2016 |
| KR | 10-2016-0131761 A | 11/2016 |
| KR | 10-2017-0037556 A | 4/2017 |
| KR | 10-2018-0033487 A | 4/2018 |
| KR | 10-2018-0081472 A | 7/2018 |
| WO | WO-2015178351 A1 * | 11/2015 .............. H01M 2/16 |

OTHER PUBLICATIONS

International Search Report issued in PCT/KR2019/014425 (PCT/ISA/210), dated Feb. 6, 2020.

Extended European Search Report for European Application No. 19880241.5, dated Mar. 23, 2021.

* cited by examiner

FIG. 1

<Inorganic layer by immersion phase separation>     <Inorganic layer by vapor-induced phase separation>

FIG. 2

CROSSLINKED POLYOLEFIN SEPARATOR HAVING INORGANIC COATING LAYER AND HIGH POWER SECONDARY BATTERY COMPRISING THE SAME

TECHNICAL FIELD

The present invention relates to a crosslinked polyolefin separator including an inorganic coating layer and a high power secondary battery including the same, and particularly, a separator including an inorganic coating layer having internal pores formed on at least one surface of a crosslinked polyolefin substrate having a plurality of pores by an immersion phase separation method, and a high power secondary battery including the same.

BACKGROUND ART

As the demand for mobile devices has increased, the demand for secondary batteries as energy sources for the mobile devices has also sharply increased. Among secondary batteries, lithium secondary batteries having high energy density and good lifespan are most widely used. When the secondary batteries are used as a power source for mobile phones, laptops, and etc., a constant output must be provided stably. When the secondary batteries are used as a power source for accelerating a power tool such as an electric drill, and an electric vehicle, they provide instantaneous high power and must be stable against external physical impacts such as vibration and being dropped.

A lithium secondary battery consists of a cathode, an anode, an electrolytic solution, and a separator. Preferably, the separator is interposed between the cathode and the anode so as to electrically insulate the cathode and the anode from each other, and it increases the permeability of lithium ions based on high porosity so as to increase the ion conductivity. As a material of the separator, polyolefins such as polyethylene, which are advantageous in forming pores, have excellent chemical resistance, mechanical properties, and electrical insulation properties, and are inexpensive, are mainly used.

As polyethylene has a low melting point of about 130° C., polyethylene does not have dimensional stability to heat generated in a battery, and is easy to have shrinkage deformation. In such a case, the cathode and the anode are in direct contact, resulting in the fire, which are caused by internal short circuit and thermal runaway.

Many methods have been proposed to improve the thermal shrinkage at high temperatures by coating an inorganic material or a heat-resistant polymer on the surface of polyethylene separators and research has been still actively conducted relating to such methods.

Nevertheless, the shutdown and meltdown temperatures of a composite separator having a coating layer of an inorganic material or a heat-resistant polymer are still in a range similar to the shutdown and meltdown temperatures of the separator prior to coating. As a result, the composite separator hardly contracts to a certain range of temperature, but rapidly contracts as it exceeds the meltdown temperature, and a large-area short circuit of the cathode and anode often causes a battery to ignite and explode.

Patent Document 1 relates to a separator using a polyolefin substrate crosslinked using a silane water crosslinking method and discloses the separator capable of providing high temperature stability of a lithium ion battery.

Patent Document 2 discloses a configuration in which an inorganic slurry coated on a porous substrate is subjected to phase separation by adding a non-solvent which is partially compatible with a solvent in manufacturing a separator including an inorganic coating layer.

However, the technology described in the above described patent documents does not meet the performance of a separator and a high power secondary battery including the same, which improve the output and the energy density at room temperature and low temperature while reducing the thickness of the separator, and have a high ion conductivity while maintaining the strength of the separator.

PRIOR ART DOCUMENT

Patent Document

Korean Patent Application Publication No. 2016-0131761 (2016 Nov. 16)

Korean Patent Application Publication No. 2017-0037556 (2017 Apr. 4)

DISCLOSURE

Technical Problem

The present invention has been made in view of the above problems, and it is an object of the present invention to provide a separator that is capable of coping to high power at room temperature and low temperature and being thin while maintaining a mechanical strength of the separator, and a high power secondary battery comprising the same.

Technical Solution

In accordance with the present invention, the above and other objects can be accomplished by the provision of a separator comprising a crosslinked polyolefin substrate having a plurality of pores; and an inorganic coating layer having internal pores formed on at least one surface of the crosslinked polyolefin substrate by immersion phase separation, wherein the inorganic coating layer on the at least one surface of the crosslinked polyolefin substrate has a total thickness greater than 1 µm.

The crosslinked polyolefin substrate may be formed by a silane water crosslinking method.

The crosslinked polyolefin substrate may have a crosslinking degree of 10% or more.

The crosslinked polyolefin substrate may have a meltdown temperature of 180° C. or more.

A thickness (A) of the crosslinked polyolefin substrate, a total thickness (B) of the inorganic coating layer on the at least one surface of the crosslinked polyolefin substrate, and a thickness (C) of the entire separator for secondary batteries satisfy the following relationship:

$7\ \mu m \leq A \leq 12\ \mu m$ $1\ \mu m < B \leq 8\ \mu m$ $C \leq 17\ \mu m$ $A + 2B \leq C$ The inorganic coating may use a mixture of inorganic particles and a binder polymer.

The inorganic particles may include high-dielectric inorganic particles having a dielectric constant of 5 or more, inorganic particles having piezoelectricity, inorganic particles having lithium ion transfer ability, or a mixture of two or more thereof.

The inorganic particles may be at least one selected from the group consisting of $Al_2O_3$, $SiO_2$, MgO, $TiO_2$ and $BaTiO_3$.

The binder polymer may be at least one selected from the group consisting of polyvinylidene fluoride (PVdF), polyvinylidene fluoride-hexafluoropropylene, polyvinyl pyrrolidone, polyacrylonitrile, polyvinylidene fluoride-trichloroethylene, polyvinylidene fluoride-chlorotrifluoroethylene (PVdF-CTFE), polymethyl methacrylate, polyvinyl acetate, ethylene-co-vinyl acetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, acrylonitrile butadiene styrene copolymer, polyimide, polyacrylonitrile-styrene copolymer, gelatin, polyethylene glycol, polyethylene glycol dimethyl ether, ethylene-propylene-diene terpolymer (EPDM), sulfonated EPDM, styrene butadiene rubber (SBR), tetrafluoroethylene (TFE), and fluoro rubber.

The binder polymer may further comprise at least one selected from among a phenolic-based compound comprising baicalin, luteolin, taxifolin, myricetin, quercetin, rutin, catechin, epigallocatechin gallate, butein, piceatannol, tannic acid, and pyrogallic acid; amylose; amylopectin; xanthan gum; and an aqueous or non-aqueous polymer consisting of fatty acid system.

Effects of the Invention

As described above, the present invention may improve thermal resistance of a substrate itself by using a porous crosslinked polyolefin substrate according to the present invention, thereby thinning the thickness of a coating layer.

In addition, when using the same content of a binder by forming internal pores in manufacturing an inorganic coating layer of the separator, it is possible to further increase the porosity of the inorganic coating layer.

In terms of performance, as the thickness of the separator may be reduced, the energy density may be improved by increasing an available space of the battery as much as it is reduced while maintaining the mechanical properties of the separator. As the porosity of the inorganic coating layer is increased, the material transfer of ions is improved and there is an advantage of having low resistance at low temperature and room temperature. With the increase of the ion conductivity, it is possible to provide a lithium secondary battery having improved life characteristics and cycle characteristics.

By using a silane water crosslinking method crosslinking in the presence of water after grafting a silane group on a polyolefin substrate and forming a final product, there is no restriction in manufacturing a separator with a stretching process, and there is an advantage in that there is almost no cost increase as there is no facility investment.

In terms of safety, since the crosslinked silane graft polyolefin has a higher meltdown temperature than a meltdown temperature of a non-crosslinked polyolefin substrate because the polyolefin is crosslinked, the meltdown phenomenon occurs at a relatively higher temperature. As a result, the thermal resistance of the separator is improved to improve the safety.

DETAILED DESCRIPTION OF THE INVENTION

Hereinafter, the present invention will be described in detail with reference to the accompanying drawings. It should be noted that terms or words used in this specification and the claims are not to be interpreted as having ordinary and dictionary-based meanings but as having meanings and concepts coinciding with the technical idea of the present invention based on the principle that the inventors may properly define the concepts of the terms in order to explain the invention in the best method. Consequently, the embodiments described in this specification are merely the most preferred embodiments and do not cover all technical ideas of the present invention, and therefore it should be understood that there may be various equivalents and modifications capable of substituting for the embodiments at the time of filing of the present application.

The present invention provides a separator for secondary batteries comprising a crosslinked polyolefin substrate having a plurality of pores; and an inorganic coating layer having internal pores formed on at least one surface of the crosslinked polyolefin substrate by immersion phase separation, wherein the inorganic coating layer on one surface of the crosslinked polyolefin substrate has a total thickness greater than 1 μm.

A thickness (A) of the crosslinked polyolefin substrate, a total thickness (B) of the inorganic coating layer on one surface of the crosslinked polyolefin substrate, and a thickness (C) of the entire separator for secondary batteries satisfy the following relationship:

$$7\ \mu m \leq A \leq 12\ \mu m$$

$$1\ \mu m < B \leq 8\ \mu m$$

$$C \leq 17\ \mu m$$

$$A + 2B \leq C$$

(1) Crosslinked Polyolefin Substrate

The separator according to the present invention comprises a substrate made of a crosslinked polyolefin resin.

The polyolefin may include homopolymers, copolymers, and mixtures thereof of olefins such as ethylene, propylene, 1-butene, 4-methyl-1-pentene, 1-hexene, 1-octene, and the like. Preferably, examples of the polyolefin may include polyethylene, polypropylene, polybutylene, polypentene, polyhexene, polyoctene, and the like.

In particular, the polyolefin may include low density polyethylene (LDPE), linear low density polyethylene (LLDPE), and high density polyethylene (HDPE), and the like. Among them, high density polyethylene having high crystallinity and high melting point of resin is preferred.

As a method of crosslinking the polyolefin, a crosslinking method using a peroxide-based initiator, a water crosslinking method using a silane material, and an electron beam crosslinking method may be applied.

Crosslinking using the peroxide-based initiator is not suitable for manufacturing a separator including the stretching process. Since electron beam crosslinking method has a disadvantage in that the facility investment cost is very high, a silane water crosslinking method using the silane material is preferred.

Preferably, a porous crosslinked polyolefin substrate according to an embodiment of the present invention crosslinks the porous substrate in the presence of water to form the porous crosslinked polyolefin substrate. The polyolefin separator according to the present invention is in a form in which a polyolefin having a weight average molecular weight of 100,000 or more is made of silane-grafted olefin, extruded, stretched, dried and crosslinked.

A crosslinked polyolefin separator is prepared in the following steps.

A silane graft polyolefin solution is prepared using a polyolefin, a diluent, an alkoxy group-containing vinylsilane, and an initiator to prepare a crosslinked polyolefin substrate. In this case, the polyolefin may have a weight average molecular weight of 100,000 or more.

The silane graft polyolefin solution is extruded to form a sheet.

A diluent is extracted from the sheet to prepare a porous substrate.

The porous substrate was crosslinked in the presence of water to prepare a porous crosslinked polyolefin substrate.

The crosslinking is carried out under 50° C. to 100° C. temperature conditions and 50% to 100% humidity conditions.

The porous crosslinked polyolefin substrate has a crosslinking degree of at least 10%, preferably 70% to 90%.

In the present invention, the phenomenon in which the shape of a separator substrate, that is, the polyolefin substrate, is melted and lost is referred to as meltdown, and the temperature is defined as a meltdown temperature.

Since the crosslinked silane graft polyolefin is crosslinked, the crosslinked silane graft polyolefin has a higher meltdown temperature than a meltdown temperature of a non-crosslinked polyolefin, and thus a meltdown phenomenon occurs at a relatively higher temperature.

Particularly, the meltdown temperature of the non-crosslinked polyolefin is less than 150° C., while the meltdown temperature of the crosslinked polyolefin according to an embodiment of the present invention is 180° C. or more.

(2) Inorganic Coating Layer

The inorganic coating layer having internal pores may be formed by immersion phase separation method.

The inorganic coating layer includes an inorganic material to secure the physical properties of a separator. In addition, the inorganic coating layer comprises a binder for fixing the inorganic material, bonding of the coating layer and the separator substrate, and providing the adhesion between the separator and an electrode.

In the immersion phase separation method, an inorganic slurry including inorganic particles, a binder, and a solvent is applied to at least one surface of the crosslinked polyolefin substrate, and then a non-solvent having partial compatibility with the solvent are added to phase separate the inorganic slurry coated on the porous substrate Phase separation of the inorganic slurry coated on the porous substrate.

In the conventional vapor-induced phase separation method, a polymer and an inorganic material are dissolved in a solvent to prepare a coating solution, and then a dense gel polymer layer is formed by dipping a polyolefin-based separator into the coating solution.

On the other hand, the immersion phase separation method according to the present invention is prepared by adding a non-solvent, for example, alcohols such as methyl alcohol, ethyl alcohol, propyl alcohol, butyl alcohol, and water, to the inorganic coating solution of the conventional method to prepare a coating solution, and then a polyolefin separator is dipped in the coating solution and dried. In this case, a structure is formed in which three-dimensional pores separated by phases having a polymer-rich region and a polymer-poor region (pores) are connected.

Figure 1:
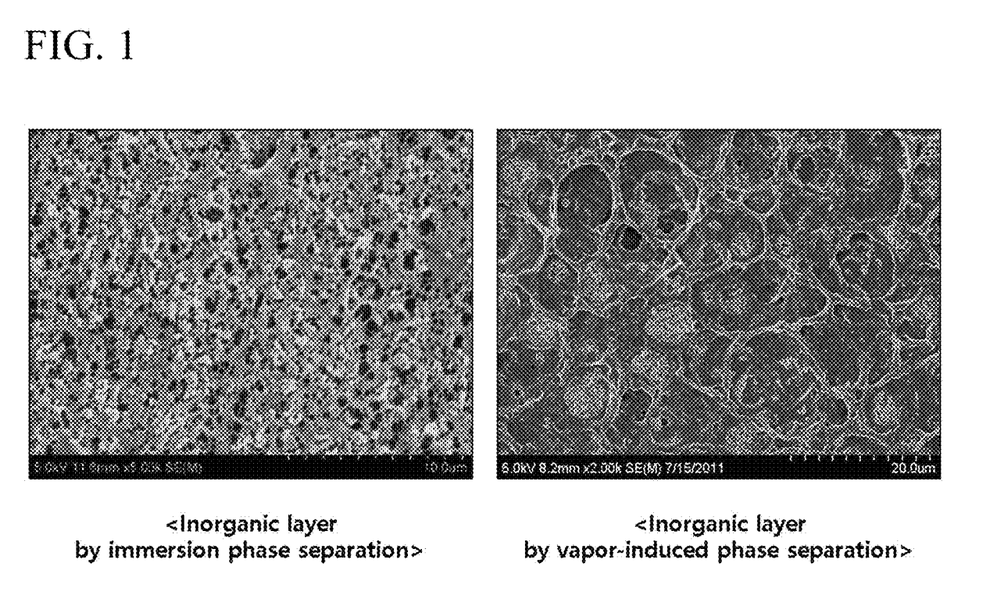
FIG. 1 is surface images showing an inorganic coating layer applying the vapor-induced phase separation method is applied (Comparative Example) and an inorganic coating layer applying the immersion phase separation method (Example of the present invention).

FIG. 1 is surface images showing an inorganic coating layer applying the vapor-induced phase separation method is applied (Comparative Example) and an inorganic coating layer applying the immersion phase separation method (Example of the present invention).

Referring to FIG. 1, it can be seen that fine pores are formed in the inorganic coating layer to which the immersion phase separation method is applied.

The inorganic particles may be at least one selected from the group consisting of (a) an inorganic material having a dielectric constant of 5 or more, (b) an inorganic material having piezoelectricity, and (c) an inorganic material having lithium ion transfer ability.

The inorganic material having a dielectric constant of 5 or more (a) may be $SrTiO_3$, $SnO_2$, $CeO_2$, $MgO$, $NiO$, $CaO$, $ZnO$, $ZrO_2$, $Y_2O_3$, $Al_2O_3$, $TiO_2$, or $SiC$.

The inorganic material having piezoelectricity (b) has a potential difference due to positive and negative charges generated between both surfaces of the particle when a certain pressure is applied and may be at least one selected from the group consisting of $BaTiO_3$, $Pb(Zr,Ti)O_3$ (PZT), $Pb_{1-x}La_xZr_{1-y}Ti_yO_3$ (PLZT), $Pb(Mg_{1/3}Nb_{2/3})O_3$—$PbTiO_3$ (PMN-PT), hafnia ($HfO_2$), $SrTiO_3$, $SnO_2$, $CeO_2$, $MgO$, $NiO$, $CaO$, $ZnO$, $ZrO_2$, $Y_2O_3$, $Al_2O_3$, $TiO_2$, $SiC$, and a mixture thereof.

The inorganic material having lithium ion transfer ability (c) are inorganic particles that contain lithium elements and transport lithium ions without storing lithium and may be at least one selected from the group consisting of lithium phosphate ($Li_3PO_4$), lithium titanium phosphate ($Li_xTi_y(PO_4)_3$, where $0<x<2$ and $0<y<3$), lithium aluminum titanium phosphate ($Li_xAl_yTi_z(PO_4)_3$, where $0<x<2$, $0<y<1$, and $0<z<3$), $(LiAlTiP)_xO_y$-based glass (where $0<x<4$ and $0<y<13$) such as $14Li_2O$-$9Al_2O_3$-$38TiO_2$-$39P_2O_5$, lithium lanthanum titanate ($Li_xLa_yTiO_3$, where $0<x<2$ and $0<y<3$), lithium germanium thiophosphate ($Li_xGe_yP_zS_w$, where $0<x<4$, $0<y<1$, $0<z<1$, and $0<w<5$) such as $Li_{3.25}Ge_{0.25}P_{0.75}S_4$, lithium nitride ($Li_xN_y$, where $0<x<4$ and $0<y<2$) such as $Li_3N$, $SiS_2$-based glass ($Li_xSi_yS_z$, where $0<x<3$, $0<y<2$, and $0<z<4$) such as $Li_3PO_4$—$Li_2S$—$SiS_2$, $P_2S_5$-based glass ($Li_xP_yS_z$, where $0<x<3$, $0<y<3$, and $0<z<7$) such as $LiI$—$Li_2S$—$P_2S_5$, and a mixture thereof.

The binder may use one or more binders in order to obtain adhesive properties required for the inorganic coating layer. For example, the binder polymer may be at least one selected from the group consisting of polyvinylidene fluoride (PVdF), polyvinylidene fluoride-hexafluoropropylene, polyvinyl pyrrolidone, polyacrylonitrile, polyvinylidene fluoride-trichloroethylene, polyvinylidene fluoride-chlorotrifluoroethylene (PVdF-CTFE), polymethyl methacrylate, polyvinyl acetate, ethylene-co-vinyl acetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, acrylonitrile butadiene styrene copolymer, polyimide, polyacrylonitrile-styrene copolymer, gelatin, polyethylene glycol, polyethylene glycol dimethyl ether, ethylene-propylene-diene terpolymer (EPDM), sulfonated EPDM, styrene butadiene rubber (SBR), tetrafluoroethylene (TFE), and fluoro rubber.

The binder polymer may further comprise at least one selected from among a phenolic-based compound comprising baicalin, luteolin, taxifolin, myricetin, quercetin, rutin, catechin, epigallocatechin gallate, butein, piceatannol, tannic acid, and pyrogallic acid; amylose; amylopectin; xanthan gum; and an aqueous or non-aqueous polymer consisting of fatty acid system.

In a concrete example, the binder may include a PVdF-based binder capable of phase separation, and the content of the PVdF-based binder may be 80 weight % or more based on the total weight of the binder. When the content of the PVdF-based binder is less than 80 weight %, it is not preferable because it is difficult to increase the porosity of the inorganic coating layer to a desired level.

Preferably, the PVdF-based binder may be at least one selected from the group consisting of PVdF and PVdF copolymers.

More preferably, the PVdF copolymers may have a content of PVdF monomer of 92 mol % or more based on the total moles of monomers constituting the copolymer. When the content of the PVdF monomer is less than 92 mol %, the occurrence of phase separation is reduced, making it difficult to increase the porosity of the inorganic coating layer to a desired level.

(3) Construction and Application of Electrode Assembly

The present invention also provides an electrochemical device including a positive electrode, a negative electrode, the porous separator interposed between the positive electrode and the negative electrode, and an electrolyte. Here, the electrochemical device may be a lithium secondary battery.

The positive electrode may be manufactured by applying a mixture of a positive electrode active material, a conductive agent, and a binder to a positive electrode current collector and drying the mixture. A filler may be further added to the mixture as needed.

In general, the positive electrode current collector is manufactured so as to have a thickness of 3 to 500 μm. The positive electrode current collector is not particularly restricted, as long as the positive electrode current collector exhibits high conductivity while the positive electrode current collector does not induce any chemical change in a battery to which the positive electrode current collector is applied. For example, the positive electrode current collector may be made of stainless steel, aluminum, nickel, titanium, or sintered carbon. Alternatively, the positive electrode current collector may be made of aluminum or stainless steel, the surface of which is treated with carbon, nickel, titanium, or silver. In addition, the positive electrode current collector may have a micro-scale uneven pattern formed on the surface thereof so as to increase the force of adhesion of the positive electrode active material. The positive electrode current collector may be configured in various forms, such as those of a film, a sheet, a foil, a net, a porous body, a foam body, and a non-woven fabric body.

The positive electrode active material may be, but is not limited to, a layered compound, such as a lithium cobalt oxide ($LiCoO_2$) or a lithium nickel oxide ($LiNiO_2$), or a compound substituted with one or more transition metals; a lithium manganese oxide represented by the chemical formula $Li_{1+x}Mn_{2-x}O_4$ (where x=0 to 0.33) or a lithium manganese oxide, such as $LiMnO_3$, $LiMn_2O_3$, or $LiMnO_2$; a lithium copper oxide ($Li_2CuO_2$); a vanadium oxide, such as $LiV_3O_8$, $V_2O_5$, or $Cu_2V_2O_7$; an Ni-sited lithium nickel oxide represented by the chemical formula $LiNi_{1-x}M_xO_2$ (where M=Co, Mn, Al, Cu, Fe, Mg, B, or Ga, and x=0.01 to 0.3); a lithium manganese composite oxide represented by the chemical formula $LiMn_{2-x}M_xO_2$ (where M=Co, Ni, Fe, Cr, Zn, or Ta, and x=0.01 to 0.1) or the chemical formula $Li_2Mn_3MO_8$ (where M=Fe, Co, Ni, Cu, or Zn); $LiMn_2O_4$ having Li of a chemical formula partially replaced by alkaline earth metal ions; a disulfide compound; or $Fe_2(MoO_4)_3$.

The conductive agent is generally added so that the conductive agent accounts for 1 to 30 wt % based on the total weight of the mixture including the positive electrode active material. The conductive agent is not particularly restricted, as long as the conductive agent exhibits high conductivity without inducing any chemical change in a battery to which the conductive agent is applied. For example, graphite, such as natural graphite or artificial graphite; carbon black, such as carbon black, acetylene black, KETJENBLACK™, channel black, furnace black, lamp black, or summer black; conductive fiber, such as carbon fiber or metallic fiber; metallic powder, such as carbon fluoride powder, aluminum powder, or nickel powder; conductive whisker, such as a zinc oxide or potassium titanate; a conductive metal oxide, such as a titanium oxide; or conductive materials, such as polyphenylene derivatives, may be used as the conductive agent.

The binder is a component assisting in binding between the active material and the conductive agent and in binding with the current collector. The binder is generally added in an amount of 1 to 30 wt % based on the total weight of the mixture including the positive electrode active material. As examples of the binder, there may be used polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluoro rubber, and various copolymers.

The filler is an optional component used to inhibit expansion of the positive electrode. There is no particular limit to the filler, as long as it does not cause chemical changes in a battery to which the filler is applied and is made of a fibrous material. As examples of the filler, there may be used olefin polymers, such as polyethylene and polypropylene; and fibrous materials, such as glass fiber and carbon fiber.

The negative electrode may be manufactured by applying a negative electrode material to a negative electrode current collector and drying the same. The above-described components may be selectively further included as needed.

In general, the negative electrode current collector is manufactured so as to have a thickness of 3 μm to 500 μm. The negative electrode current collector is not particularly restricted, as long as the negative electrode current collector exhibits high conductivity while the negative electrode current collector does not induce any chemical change in a battery to which the negative electrode current collector is applied. For example, the negative electrode current collector may be made of copper, stainless steel, aluminum, nickel, titanium, or sintered carbon. Alternatively, the negative electrode current collector may be made of copper or stainless steel, the surface of which is treated with carbon, nickel, titanium, or silver, or an aluminum-cadmium alloy. In addition, the negative electrode current collector may have a micro-scale uneven pattern formed on the surface thereof so as to increase the force of adhesion of the negative electrode active material, in the same manner as the positive electrode current collector. The negative electrode current collector may be configured in various forms, such as those of a film, a sheet, a foil, a net, a porous body, a foam body, and a non-woven fabric body.

As the negative electrode active material, for example, there may be used carbon, such as a non-graphitized carbon or a graphite-based carbon; a metal composite oxide, such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, 2 and 3 elements of the periodic table, halogen; $0 < x \leq 1$; $1 \leq y \leq 3$; $1 \leq z \leq 8$); lithium metal; lithium alloy; silicon-based alloy; tin-based alloy; a metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$; a conductive polymer, such as polyacetylene; or a Li—Co—Ni based material.

The present invention may provide a battery pack including the secondary battery.

Specifically, the battery pack may be used as a power source for a device requiring the ability to withstand high temperatures, a long lifespan, high rate characteristics, etc. Specific examples of the device may include a mobile electronic device, a wearable electronic device, a power tool driven by a battery-powered motor; an electric automobile, such as an electric vehicle (EV), a hybrid electric vehicle (HEV), or a plug-in hybrid electric vehicle (PHEV); an electric two-wheeled vehicle, such as an electric bicycle (E-bike) or an electric scooter (E-scooter); an electric golf cart; and a power storage system. However, the present invention is not limited thereto.

Hereinafter, the present invention will be described with reference to the following examples. These examples are provided only for illustration of the present invention and should not be construed as limiting the scope of the present invention.

Example 1

(1) Preparation of Crosslinked Polyolefin Substrate

A silane graft polyolefin solution was prepared using polyethylene, a diluent, an alkoxy group-containing vinylsilane, and an initiator to prepare the crosslinked polyolefin substrate.

The silane graft polyolefin solution was extruded to form a sheet.

A diluent was extracted from the sheet to prepare a porous substrate.

The porous substrate was crosslinked in the presence of water to prepare a porous crosslinked polyolefin substrate having a thickness of 7 μm. The degree of crosslinking of the prepared crosslinked polyolefin substrate was 86%.

At this time, the prepared crosslinked polyolefin substrate was immersed in a xylene solution of 135° C. and boiled for 12 hours according to ASTM D 2765, and then the remaining weight was measured and calculated as a percentage of the remaining weight to the initial weight.

(2) Coating of Inorganic Coating Layer 5 weight % of polyvinylidene fluoride-hexafluoropropylene (PVdF-HFP) was added to acetone, and then dissolved at a temperature of 50° C. for 12 hours or more to prepare a polymer solution. An inorganic slurry was prepared by adding non-solvent methanol by 30 vol % based on acetone to the polymer solution and adding $Al_2O_3$ inorganic particles to the polymer solution.

The inorganic slurry was prepared as a coating liquid according to the immersion phase separation method, thereby forming a double-sided coating layer having a double-sided total thickness of 4 μm on the crosslinked polyolefin substrate by a dip coating method. The coating layer was dried at 80° C. for 1 minute.

In the drying step, a structure is formed in which three-dimensional pores separated by phases having a polymer-rich region and a polymer-poor region are connected to each other. A secondary battery was manufactured by applying the separator.

Example 2

A separator was prepared using the same method as in Example 1, except that the polyolefin substrate had a thickness of 9 μm and the inorganic slurry was applied on both sides with a double-sided total thickness of 2 μm on the polyolefin substrate. A secondary battery was manufactured by applying the separator.

Example 3

A separator was prepared using the same method as in Example 1, except that the thickness of the crosslinked polyolefin substrate having a crosslinking degree of 80% was 9 μm. A secondary battery was manufactured by applying the separator.

Example 4

A separator was prepared using the same method as in Example 1, except that the inorganic slurry was applied on both sides with a double-sided total thickness of 8 μm on the polyolefin substrate. A secondary battery was manufactured by applying the separator.

Example 5

A separator was prepared using the same method as in Example 1, except that the polyolefin substrate had a thickness of 9 μm and the inorganic slurry was applied on both sides with a double-sided total thickness of 8 μm on the polyolefin substrate. A secondary battery was manufactured by applying the separator.

Comparative Example 1

A separator was prepared using the same method as in Example 1, except that the process of phase separation by immersion in a partially compatible non-solvent in Example 1 was omitted.

Comparative Example 2

A separator was prepared using the same method as in Example 2, except that the process of phase separation by immersion in a partially compatible non-solvent in Example 2 was omitted. A secondary battery was manufactured by applying the separator.

Comparative Example 3

A separator was prepared using the same method as in Example 2, except that the inorganic slurry was applied on both sides with a double-sided total thickness of 4 μm on the polyolefin substrate. A secondary battery was manufactured by applying the separator.

Comparative Example 4

A separator was prepared using the same method as in Example 5, except that a 9 μm polyethylene porous film was used in place of the crosslinked porous polyolefin substrate and the process of phase separation by immersion in a partially compatible non-solvent in Example 5 was omitted. A secondary battery was manufactured by applying the separator.

Comparative Example 5

A separator was prepared using the same method as in Example 5, except that a 12 μm polyethylene porous film was used in place of the crosslinked porous polyolefin substrate and the process of phase separation by immersion in a partially compatible non-solvent in Example 5 was omitted. A secondary battery was manufactured by applying the separator.

Comparative Example 6

A separator was prepared using the same method as in Example 2, except that the inorganic slurry was applied on both sides with a double-sided total thickness of 1 μm on the polyolefin substrate. A secondary battery was manufactured by applying the separator.

Experimental Example

1) Resistance Measurement Test

The room temperature resistance was measured from change in voltage generated for 10 seconds by flowing 2.5 C CC current at the cell driving voltage of 2.5V-4.2V and S0050 at 25° C.

$R = \Delta V/I$

The low temperature resistance was measured from change in voltage generated for 10 seconds by flowing 2.5 C CC current at the cell driving voltage of 2.5V-4.2V and S0050 at −10° C.

$R = \Delta V/I$

2) Meltdown Temperature Evaluation

A specimen in 20 mm×100 mm size is prepared and load cells are installed at both ends. The meltdown temperature was measured while raising the temperature of the chamber at 1° C./min.

The resistance of the secondary batteries manufactured in Examples 1 to 5 and Comparative Examples 1 to 6 were measured, and the results are shown in Table 1 below.

TABLE 1

| | Polyolefin substrate | | Inorganic layer | | Total thickness of separator (μm) | 40 Ah Cell resistance | | 40 Ah Cell safety test |
| --- | --- | --- | --- | --- | --- | --- | --- | --- |
| | Crosslinking degree (%) | Thickness (μm) | Immersion phase separation | Total thickness (μm) | | 25° C., SOC 50 (mohm) | −10° C., SOC 50 (mohm) | Nail penetration |
| Example 1 | 86 | 7 | ○ | 4 | 11 | 1.93 | 3.87 | HL2[1], No event |
| Example 2 | 86 | 9 | ○ | 2 | 11 | 2.02 | 4.01 | HL2, No event |
| Example 3 | 80 | 9 | ○ | 4 | 13 | 2.10 | 4.23 | HL2, No event |
| Example 4 | 86 | 7 | ○ | 8 | 15 | 2.09 | 4.16 | HL2, No event |
| Example 5 | 86 | 9 | ○ | 8 | 17 | 2.18 | 4.36 | HL2, No event |
| Comparative Example 1 | 86 | 7 | X | 4 | 11 | 1.98 | 3.98 | HL2, No event |
| Comparative Example 2 | 86 | 9 | X | 2 | 11 | 2.12 | 4.32 | HL2, No event |
| Comparative Example 3 | 86 | 9 | X | 4 | 13 | 2.14 | 4.36 | HL2, No event |
| Comparative Example 4 | <10% | 9 | X | 8 | 17 | 2.30 | 5.00 | HL2, No event |
| Comparative Example 5 | <10% | 12 | X | 8 | 20 | 2.27 | 4.48 | HL5[2] |
| Comparative Example 6 | 86 | 9 | ○ | 1 | 10 | 2.00 | 3.95 | HL5 |

[1] HL2(Hazard level 2): Defect, Damage; no leakage, no venting, fire or flame, no rupture, no explosion, no exothermic reaction, Cell irreversibly damaged.
[2] HL5(Hazard level 5): Fire of flame; no rupture, no explosion.

Figure 2:
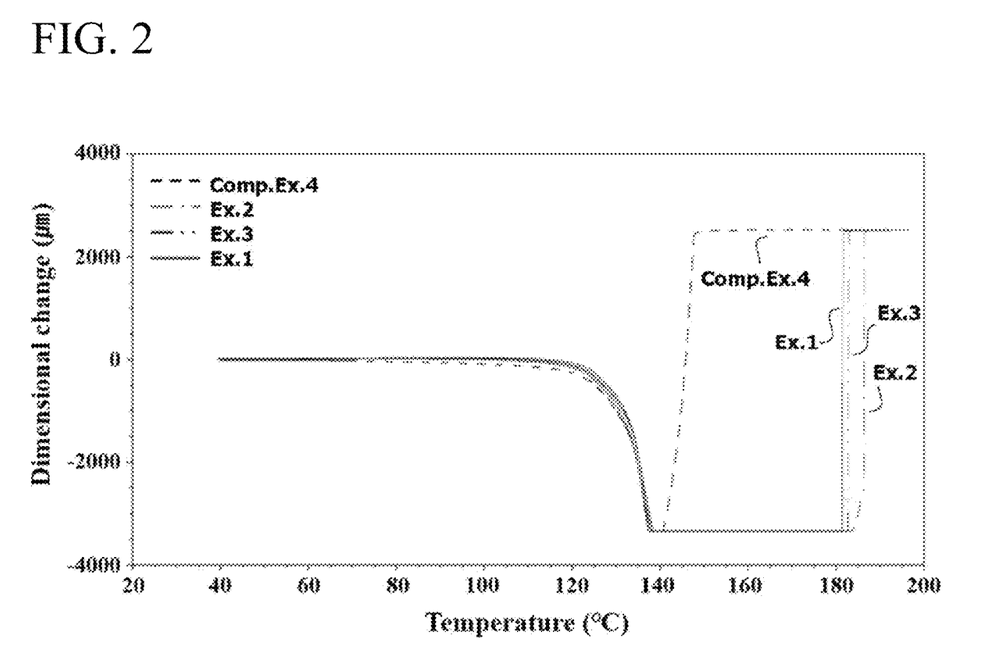
FIG. 2 is a graph showing meltdown temperatures of Examples and Comparative Examples of the present invention.

FIG. 2 is a graph showing meltdown temperatures of Examples and Comparative Examples of the present invention.

Referring to FIG. 2, the x-axis represents the temperature and the y-axis represents the dimensional change, i.e. the dimensional change before and after the heat treatment. In the graph, the portion where the value of the dimensional change is changed from 0 to (−) is a shutdown region, and the temperature rapidly changing from (−) to (+) is a meltdown temperature.

That is, while the meltdown temperature of Comparative Example 4 is 140° C., it can be seen that the meltdown temperature of Examples 1 to 3 is 180° C. or more.

Although described above with reference to examples of the present invention, those skilled in the art to which the present invention pertains will appreciate that various applications and modifications are possible based on the above description, without departing from the scope of the present invention.

The invention claimed is:

1. A separator for secondary batteries, comprising:
a crosslinked polyolefin substrate having a plurality of pores; and
an inorganic coating layer having internal pores formed on at least one surface of the crosslinked polyolefin substrate by immersion phase separation,
wherein the inorganic coating layer on the at least one surface of the crosslinked polyolefin substrate has a total thickness greater than 1 μm,
wherein the crosslinked polyolefin substrate is formed by a silane water crosslinking method,
wherein the immersion phase separation is prepared by adding a non-solvent to an inorganic coating solution, and then the crosslinked polyolefin substrate is coated with the inorganic coating solution and dried to form the inorganic coating layer,
wherein the immersion phase separation forms three-dimensional pores separated by a first region and a second region, wherein the first region comprises a larger amount of polymer than the second region, and wherein the first and second regions are connected to each other,
wherein a thickness (A) of the crosslinked polyolefin substrate, one side thickness (B) of the inorganic coating layer on the at least one surface of the crosslinked polyolefin substrate, and a thickness (C) of the entire separator for secondary batteries satisfy the following relationship:

$7\ \mu m \leq A \leq 12\ \mu m$, $1\ \mu m < B \leq 8\ \mu m$, and $8\ \mu m < C \leq 17\ \mu m$, wherein the inorganic coating layer comprises a mixture of inorganic particles and a binder polymer, and the inorganic particles are at least one of dielectric inorganic particles having a dielectric constant of 5 or more, inorganic particles having piezoelectricity, or inorganic particles having lithium ion transfer ability,
wherein the binder polymer is at least one selected from the group consisting of polyvinylidene fluoride (PVdF), polyvinylidene fluoride-hexafluoropropylene, polyvinyl pyrrolidone, polyacrylonitrile, polyvinylidene fluoride-trichloroethylene, polyvinylidene fluoride-chlorotrifluoroethylene (PVdF-CTFE), polymethyl methacrylate, polyvinyl acetate, ethylene-co-vinyl acetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, acrylonitrile butadiene styrene copolymer, polyacrylonitrile-styrene copolymer, gelatin, polyethylene glycol, polyethylene glycol dimethyl ether, ethylene-propylene-diene terpolymer (EPDM), sulfonated EPDM, styrene butadiene rubber (SBR), tetrafluoroethylene (TFE), and fluoro rubber, and
wherein the inorganic particles are at least one selected from the group consisting of $Al_2O_3$, $SiO_2$, MgO, $TiO_2$ and $BaTiO_3$.

2. The separator for secondary batteries according to claim 1, wherein the crosslinked polyolefin substrate has a cross-linking degree of 10% or more.

3. The separator for secondary batteries according to claim 1, wherein the crosslinked polyolefin substrate has a meltdown temperature of 180° C. or more.

4. The separator for secondary batteries according to claim 1, wherein the binder polymer further comprises at least one selected from among a phenolic-based compound comprising at least one of baicalin, luteolin, taxifolin, myricetin, quercetin, rutin, catechin, epigallocatechin gallate, butein, piceatannol, tannic acid, and pyrogallic acid; amylose; amylopectin; xanthan gum; and an aqueous or non-aqueous polymer consisting of fatty acid system.

5. A secondary battery comprising the separator for secondary batteries according to claim 1.

* * * * *